United States Patent
Hiasa

(10) Patent No.: US 9,665,744 B2
(45) Date of Patent: May 30, 2017

(54) INPUT FRONT-END CIRCUIT FOR SWITCHING POWER SUPPLY CONTROL INTEGRATED CIRCUIT AND SWITCHING POWER SUPPLY CONTROLLER HAVING THE SAME

(71) Applicant: Fuji Electric Co., Ltd., Kanagawa (JP)

(72) Inventor: Nobuyuki Hiasa, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/150,633

(22) Filed: May 10, 2016

(65) Prior Publication Data

US 2016/0364585 A1    Dec. 15, 2016

(30) Foreign Application Priority Data

Jun. 12, 2015    (JP) .................................. 2015-119701

(51) Int. Cl.
*H02M 3/335*    (2006.01)
*G06G 7/14*    (2006.01)
*H02M 1/00*    (2006.01)

(52) U.S. Cl.
CPC .............. *G06G 7/14* (2013.01); *H02M 3/335* (2013.01); *H02M 3/33507* (2013.01); *H02M 2001/0006* (2013.01)

(58) Field of Classification Search
CPC ........................................... H02M 2001/0083
See application file for complete search history.

(56) References Cited

U.S. PATENT DOCUMENTS

| | | | | |
|---|---|---|---|---|
| 6,356,466 B1* | 3/2002 | Smidt | ............... | H02M 3/33507 323/222 |
| 7,990,120 B2* | 8/2011 | Leonard | ................ | H02M 3/156 323/224 |
| 8,081,495 B2* | 12/2011 | Vecera | .................... | H02M 1/32 363/21.12 |
| 8,368,361 B2* | 2/2013 | Melanson | ............. | H02M 3/156 323/224 |
| 8,773,111 B2* | 7/2014 | Nishikawa | .......... | H02M 1/4225 323/222 |
| 8,830,699 B2* | 9/2014 | Boku | .................... | H02M 3/335 323/299 |
| 2008/0298105 A1 | 12/2008 | Kashima | | |
| 2009/0268488 A1 | 10/2009 | Fujii | | |

(Continued)

FOREIGN PATENT DOCUMENTS

| JP | 2009-011147 A | 1/2009 |
|---|---|---|
| JP | 2009-268316 A | 11/2009 |

(Continued)

*Primary Examiner* — Jeffrey Zweizig
(74) *Attorney, Agent, or Firm* — Chen Yoshimura LLP

(57) ABSTRACT

An inverting amplifier creates a voltage C using a reference voltage (voltage B) as a reference point. An adder composed of two input inverting amplifier circuits ultimately creates a voltage D by carrying out weighted addition of the voltage A and the voltage C. By using the voltage D created by an input front-end circuit, the internal functions of the control IC can prevent the operating points and control amounts for each function from being different relative to the input voltage and make it possible to distinguish voltage within the control IC from zero voltage when the lowest input voltage is received.

12 Claims, 7 Drawing Sheets

(56) References Cited

U.S. PATENT DOCUMENTS

| | | | | |
|---|---|---|---|---|
| 2012/0026765 A1* | 2/2012 | Adragna | ............ | H02M 1/4225 363/78 |
| 2012/0049829 A1* | 3/2012 | Murakami | ............ | H02M 1/32 323/288 |
| 2012/0250362 A1 | 10/2012 | Chen | | |
| 2014/0016365 A1 | 1/2014 | Maruyama | | |

FOREIGN PATENT DOCUMENTS

| | | |
|---|---|---|
| JP | 2012-222864 A | 11/2012 |
| JP | 2014-023208 A | 2/2014 |

* cited by examiner

INPUT FRONT-END CIRCUIT FOR SWITCHING POWER SUPPLY CONTROL INTEGRATED CIRCUIT AND SWITCHING POWER SUPPLY CONTROLLER HAVING THE SAME

BACKGROUND OF THE INVENTION

Technical Field

The present invention relates to input front-end circuits used when external signals are sent to a switching power supply control IC.

Background Art

Input pre-circuits convert voltage that an integrated circuit (IC) receives an external source such that the voltage is in a range that is appropriate for processing by a circuit within the IC itself. FIG. 5 shows the first of two example configurations of a conventional input front-end circuit for a switching power supply control IC. In addition, FIG. 6 shows an example configuration of a general switching power supply device configured to include a switching power supply control IC 8.

In FIGS. 5 and 6, respectively, the reference character 1 represents an AC input (input voltage VAC), 2 represents a transformer for forming an input filter, 3 represents a capacitor for forming the input filter, 4 represents a diode bridge for rectifying the AC input, 5 represents a capacitor for removing switching-induced ripple and noise, 6 represents a diode for changing the AC input into an input voltage for the control IC using half-wave rectification, 7 represents a resistor for limiting input current to the control IC, 8 represents the control IC, 9 represents a thermistor connected to a LAT terminal of the control IC for latch shutdown-type overheat protection, 10 and 11 represent a capacitor and a resistor, respectively, for forming a noise filter of a CS terminal, 12 represents a sense resistor for converting the ON current of a MOSFET into a voltage, 13 represents a capacitor for holding the voltage of a VCC terminal, which is the power supply of the control IC, 14 represents a diode for preventing a reverse current from flowing from the VCC terminal to an auxiliary winding, 15 represents the auxiliary winding of a transformer for supplying the power supply to the control IC when in operation, 16 represents a primary winding of the transformer, 17 represents the MOSFET for switching, 18 represents a secondary winding of the transformer, 19 represents a diode for rectifying the secondary-side voltage, 20 represents a capacitor for smoothing the secondary-side voltage, 21 represents a photocoupler for sending secondary-side load information to the primary-side, 22 represents a shunt regulator for converting the output voltage state into a current, 23 and 24 represent resistors for dividing the output voltage, and 25 represents a secondary-side output and a terminal connected to a load (not shown).

The IC input terminal shown in FIG. 5 corresponds to a VH terminal of the control IC 8 in FIG. 6. The VH terminal monitors the input voltage and monitors the input voltage peak or whether or not the input voltage is being applied in order to make the function block within the control IC correct circuit characteristics in accordance with the input voltage.

Furthermore, the VH terminal makes the function block within the control IC carry out functions such as suspending the operations of the control IC when the peak voltage decreases or suspending operations until at least a prescribed low voltage is reached when the input voltage is being applied.

When the input voltage to be monitored is from a worldwide power supply, due to the input specifications being 85 Vac to 264 Vac, the VH terminal input voltage rectified by the rectifier diode 6 shown in FIG. 6 can be 0 Vdc to approximately 120 Vdc or even 0 Vdc to 380 Vdc.

In order to receive and process the input voltage from a worldwide power supply using a single control IC, it is necessary to assume that a voltage of 0 Vdc to 400 Vdc will be received. On the other hand, for control ICs that receive signals, a voltage-dividing resistor is prepared within the input terminal, and voltages of 0 Vdc to 400 Vdc are converted into voltages capable of being processed within the control IC. The internal power supply of the control IC has a large division ratio such as 1:250 because the internal power supply is at 5V (recently 3.3V), which is much lower than the voltages within the input voltage range.

When the input voltage is high, the divided voltage is 1V to less than 2V and is sufficient for a range of internal circuit operations, but when a low input voltage is detected, for example when 45 Vdc is detected, the signal is extremely low at 0.18V and close to the lower limit of the input range for the receiving-side internal circuit of the control IC, thereby mixing with noise within the control IC and making it difficult to distinguish between the signal and the noise, which causes the control IC to malfunction and/or falsely detect.

For the same reason, it also becomes difficult to define, with high accuracy, the circuit characteristics using the control IC specifications.

Note that, in order to solve these problems, a plurality of division ratios can be prepared in accordance with the voltage to be detected, or a voltage-divided signal is amplified using an AMP 103 or the like for each function in accordance with the voltage to be detected as shown in the second of two example configurations of an input front-end circuit 100 in a switching power supply control IC of FIG. 7.

However, for the second of two example configurations of the input front-end circuit 100 shown in FIG. 7, when a function for function block A to monitor the entire input range to control constant-switching pulse and a function for function block B to switch to a control mode using an approximate specific low input voltage are provided, a configuration is adopted for amplifying the input voltage using the AMP 103 or the like, because information on high input voltage is not required for function block B. For example, such a configuration was applied to the MUL terminal shown in FIGS. 2 and 4 of Patent Document 1 and to the VH terminal shown in FIG. 1 of Patent Document 2.

However, using such a configuration may be inconvenient due to problems such as errors from the AMP 103 being applied to the input part of function block B.

In other words, it is inconvenient that a function group for executing a plurality of functions based on a single input does not act together based on information on a plurality of inputs. This inconvenience is allowed as long as the control mode switching points are only slightly unaligned, but in a worst-case scenario, the control mode switching needs an excessive amount of responses from the switching control, potentially causing hunting.

The present invention addresses a first problem of removing the above inconvenience.

Next, the present invention addresses a second problem of not receiving voltage having a significant amplitude such as an AC voltage as the input voltage. These problems are described below.

Power-factor correction control ICs and the like generally control switching pulses in accordance with the input AC voltage, but there are recent control schemes that monitor the entire circuit current of the switching power supply instead of the input voltage.

For these schemes, the sinusoidal behavior of the input voltage appears in the peak current of the circuit current, is converted into a voltage by a sense resistor, and is then received by the control IC.

In this configuration, the current-sensing resistor is extremely small in order to minimize energy loss, and as a result, the voltage that the control IC receives is low. For power-factor correction control ICs in particular, it is necessary to detect the timing at which the circuit current crosses zero using the IS terminal shown in FIG. 1 of Patent Document 3, for example; thus, it is difficult to handle miniscule voltages, which may lead to malfunctions.

RELATED ART DOCUMENTS

Patent Documents

Patent Document 1: Japanese Patent Application Laid-Open Publication No. 2009-011147
Patent Document 2: Japanese Patent Application Laid-Open Publication No. 2009-268316
Patent Document 3: Japanese Patent Application Laid-Open Publication No. 2012-222864

SUMMARY OF THE INVENTION

As described above, it is necessary to simultaneously satisfy the three points shown below in order to avoid the control IC malfunctioning/falsely detecting due to it being difficult to distinguish between noise and the signals that the control IC receives. These three points are: (a) continuously monitoring the entire input voltage range, (b) continuously monitoring the entire input range, or in other words, a range of a low voltage input (minimum input) to a high voltage input (maximum input), and controlling a signal to be monitored such that, when the signal appears, the signal falls within a suitable voltage range for the internal circuits of the control IC, and (c) having the functions control the voltage of the signal using threshold values (reference voltages) corresponding to each function in addition to monitoring signals having a single input voltage.

Thus, the present invention addresses providing an input front-end circuit for a switching power supply control IC that monitors input voltage in the entire input range and that controls the voltage of the signal such that the input voltage from is within the appropriate voltage range necessary for the control IC. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a first aspect, the present disclosure provides an input front-end circuit for a switching power supply control integrated circuit, including: a first inverting amplifier that receives a first voltage originating from an input voltage at an input and that receives a first reference voltage at a reference input so as to generate an inverted and amplified voltage as a second voltage; an adder including a second inverting amplifier that receives the first voltage at a first input, the second voltage at a second input, and a second reference voltage at a reference input so as to output a resulting added, inverted, and amplified signal to one or more components within the switching power-supply control integrated circuit.

In another aspect, the present disclosure provides an input front-end circuit for a switching power supply control integrated circuit, including: a first inverting amplifier that receives a first voltage originating from an input voltage at an input and that receives a first reference voltage at a reference input so as to output an inverted and amplified voltage as a second voltage; a second inverting amplifier that receives the second voltage at an input and that receives a second reference voltage at a reference input so as to output a resulting inverted and amplified voltage to one or more components within the switching power-supply control integrated circuit.

In the respective abovementioned aspects, the input front-end circuit may further include an input terminal that receives the input voltage and forwards the received input voltage to the first inverting amplifier as the first voltage. Furthermore, in the respective abovementioned aspects, the input front-end circuit may further include an input terminal that receives the input voltage; and a resistive divider that divides the input voltage received by the input front-end circuit and forwards the divided input voltage to the first inverting amplifier and the second inverting amplifier as the first voltage.

In the respective abovementioned aspects, the first reference voltage may be greater than the second reference voltage.

Furthermore, in one aspect, the present disclosure provides a switching power supply controller, including: the input front-end circuit for the switching power supply control integrated circuit according to the respective abovementioned aspects; and the switching power supply control integrated circuit.

In such an aspect, the input front-end circuit may be integrally formed within the switching power supply control integrated circuit.

Using the present invention, it is possible to provide an input front-end circuit for a switching power supply control IC that monitors input voltage in the entire input range and that controls the voltage of the signal such that the input voltage from is within the appropriate voltage range necessary for the control IC.

In other words, by using a signal voltage outputted from the input front-end circuit, it is possible to prevent the operating points and control amounts for each function from being different relative to the input voltage (VAC, for example), and at the same time, it is possible to distinguish voltage within the control IC from zero voltage when the lowest input voltage is received, thus making it possible to avoid mistaking the voltage for noise as well as making it possible to prevent malfunctions during signal processing within the control IC.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention are described in detail below.

Embodiment 1

Figure 1:
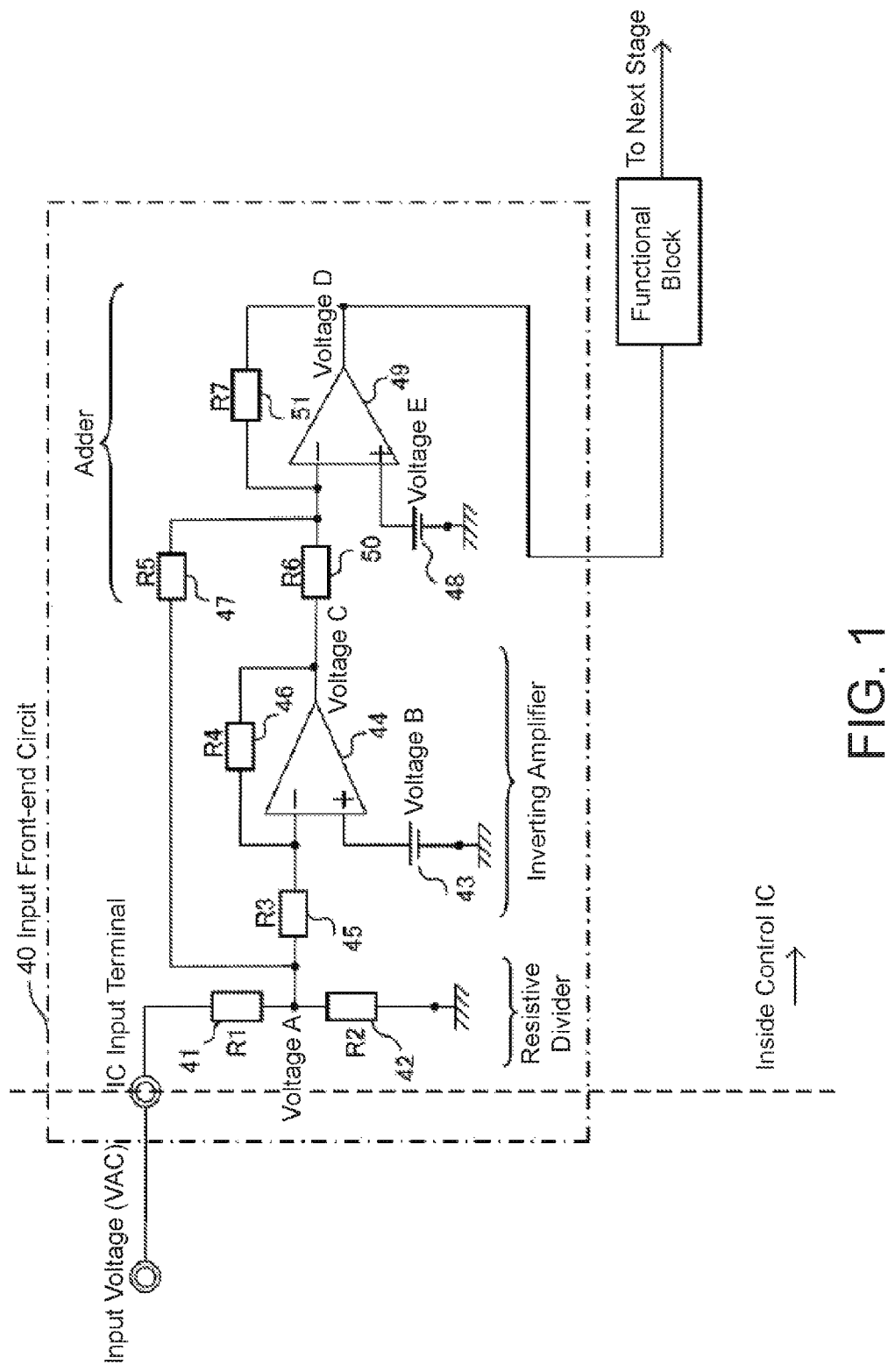
FIG. 1 shows the configuration of an input front-end circuit for a switching power supply control IC according to Embodiment 1 of the present invention.

FIG. 1 shows the configuration of an input front-end circuit for a switching power supply control IC according to Embodiment 1 of the present invention. The operations of the input front-end circuit 40 according to Embodiment 1 of the present invention are described using FIG. 1.

The input front-end circuit 40 shown in FIG. 1 divides input voltage from a wide input voltage range (voltage VAC from a rectified alternating-current commercial power supply, for example) using a resistive divider unit, sends the input voltage into a control IC unit, and then carries out signal processing.

Specifically, (1) a voltage A is created by dividing the input voltage (VAC, for example) using resistors R1 (41) a R2 (42).

(2) A voltage C is created by inverting and amplifying the voltage A using an inverting amplifier (inverting amplifier 1; first inverting amplifier) with a reference point, voltage B (43), which is configured to be lower than the internal voltage of the control IC unit. Here, using voltage B as a reference point means having voltage C, which is the output voltage of the inverting amplifier, be represented by the expression below using the input voltage A and the voltage B.

Voltage $C$ = Voltage $B - K0 \times$ (Voltage $A$ - Voltage $B$)

Here, K0 represents a constant.

Specifically, if the resistance values of the resistors R3 (45), R4 (46) are represented by R3 and R4, then K0=R4/R3.

Note that the inverting amplifier (inverting amplifier 1) is composed of an inverting amplifier circuit (second inverting amplifier). The inverting amplifier circuit is composed of an operational amplifier (44), a reference voltage (43), and resistors R3 (45), R4 (46).

(3) Finally, a voltage D is created by adding the voltage A and the voltage C together using an adder. In other words, the adder has two inputs (the voltage A and the voltage C) and is composed of an inverting amplifier circuit that uses, as a reference point, a voltage E that is a reference voltage E (48). The adder adds together signals having an inversion amplified voltage A and voltage C. The voltage A and the voltage C have been inverted and amplified at respectively different amplification rates. The adder outputs the product of that addition. (The inverting amplifier circuit in the adder is composed of an operational amplifier (49), the reference voltage (48), and resistors R5 (47), R6 (50), R7 (51). Note that how the formula representing the voltage D was derived will be described hereafter.

By using the voltage D created by the input front-end circuit 40, it becomes possible to prevent the operating points and control amounts for each function from being different relative to the input voltage (VAC, for example) and at the same time makes it possible to distinguish voltage within the control IC from zero voltage when the lowest input voltage is received, thus making it possible to avoid mistaking the voltage for noise as well as making it possible to prevent malfunctions during signal processing within the control IC. The input front-end circuit can be integrally or separately provided with the switching power supply control integrated circuit.

Figure 2:
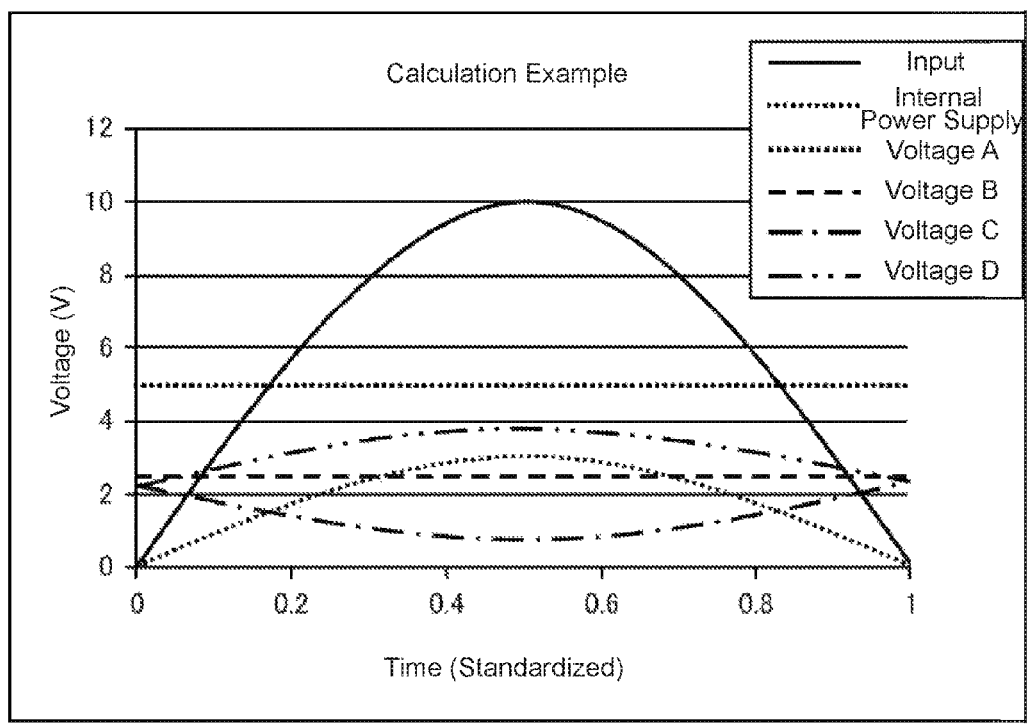
FIG. 2 is a graph showing changes for voltages A to D calculated using the configuration shown in FIG. 1.

FIG. 2 is a graph showing changes for the voltages A to D calculated using the configuration shown in FIG. 1.

Voltage A is the value for the input voltages (VAC, for example) after being divided using resistors R1 (41), R2 (42). Note that the input voltages correspond to a scale different from the scale represented by the vertical axis of FIG. 2 (this scale is not shown and is larger than the scale of FIG. 2). Voltage B is a fixed value configured to be lower than the internal power supply of the control IC. Voltage C is an output value created using the inverting amplifier (the direction that the voltage of the output value C changes is the inverse of the direction that voltage A changes). Voltage D is the output voltage created using the adder (and is the result of carrying out weighted addition on voltage A and voltage C). Voltage D is the target signal created by equipping the input front-end circuit 40.

As can be seen from the waveforms shown in FIG. 2, the output signal (target signal) (voltage D) of the input front-end circuit is higher than zero voltage when a low input voltage is received, thus making it easy to distinguish the signal from noise, and making it possible to prevent malfunctions during signal processing within the control IC.

Embodiment 2

Figure 3:
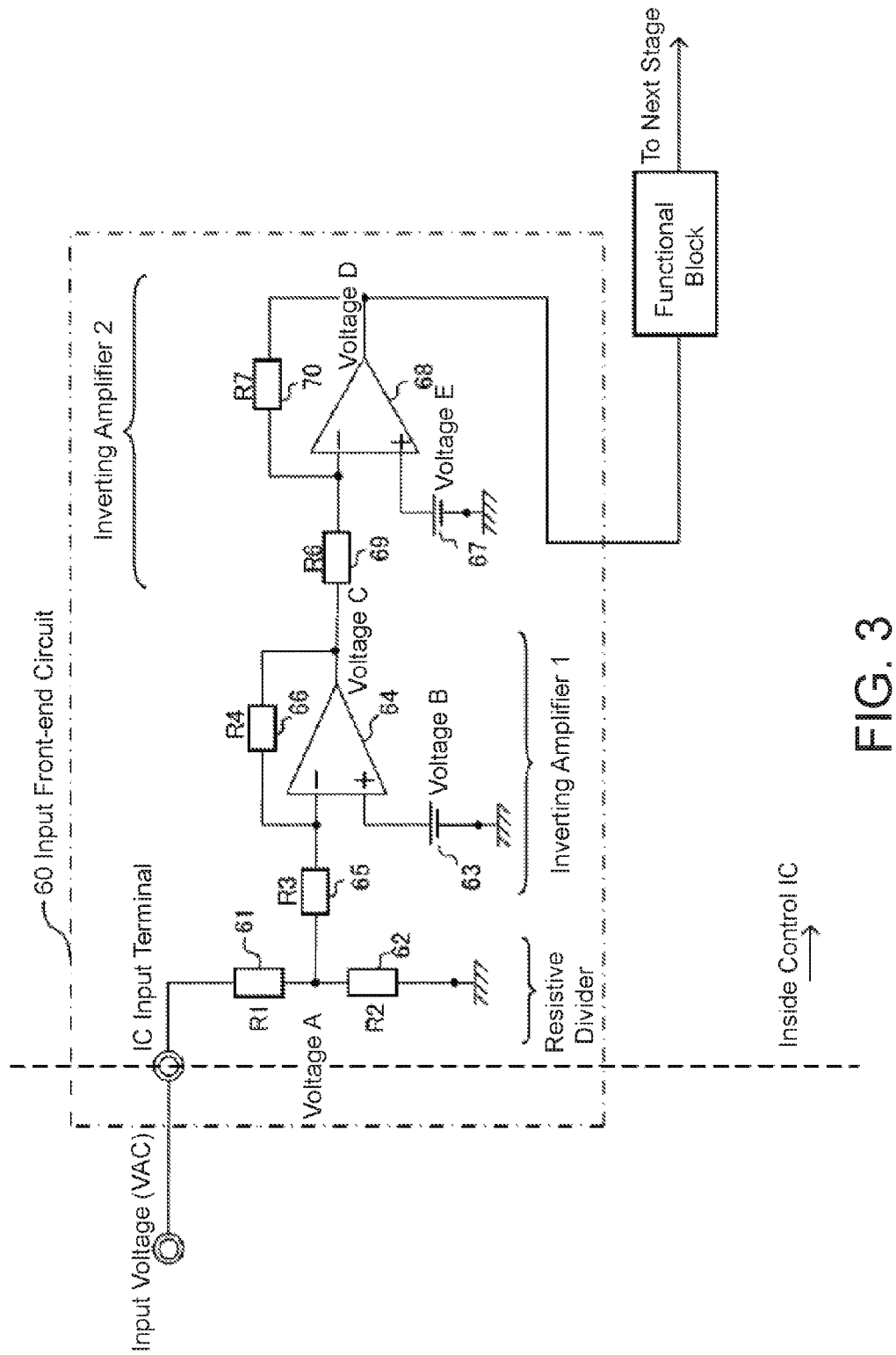
FIG. 3 shows the configuration of an input front-end circuit for a switching power supply control IC according to Embodiment 2 of the present invention.

FIG. 3 shows the configuration of an input front-end circuit for a switching power supply control IC according to Embodiment 2 of the present invention. The configuration of an input front-end circuit 60 according to Embodiment 2 of the present invention shown in FIG. 3 is the same as the configuration of the input front-end circuit 40 according to Embodiment 1 of the present invention shown in FIG. 1, except that the feedback resistor R5 of the adder has been removed and that the adder has been substituted with a single input inverting amplifier 2.

In the configuration shown in FIG. 3, the inverting amplifier 2 is provided instead of the adder shown in FIG. 1, and the voltage C, which is the output of the inverting amplifier 1, is level shifted using the inverting amplifier 2 to obtain the voltage D. Note that the inverting amplifier 2 is composed of an inverting amplifier circuit. The inverting amplifier circuit is composed of an operational amplifier (68), a reference voltage (67), and resistors R6 (69), R7 (70). In addition, the inverting amplifier (inverting amplifier 1) is composed of an inverting amplifier circuit. The inverting amplifier circuit is composed of an operational amplifier (64), a reference voltage (63), and resistors R3 (65), R4 (66). Thus, even when the resistor R5 shown in FIG. 1 is removed, it is possible for the configuration shown in FIG. 3 to carry out roughly the same operations as the configuration shown in FIG. 1, because the configuration shown in FIG. 3 is set to obtain the output voltage C of the inverting amplifier 1, which is related to the voltage A, and furthermore to obtain the output voltage D by level shifting the voltage C using the inverting amplifier 2.

However, when the input front-end circuit 60 is configured to have the resistor R5 of Embodiment 1 shown in FIG. 1 removed, a constant term (voltage Vd when Vin=0) determined using formula 4 described hereafter may have a tendency to be negative when voltage $V_B$>voltage $V_E$.

In this case, it is desirable that the resistor R5 be not removed (because the output of the input front-end circuit 60, or in other words, the target voltage D, is close to zero voltage (see FIG. 2). This is described in detail later.

Embodiment 3

Figure 4:
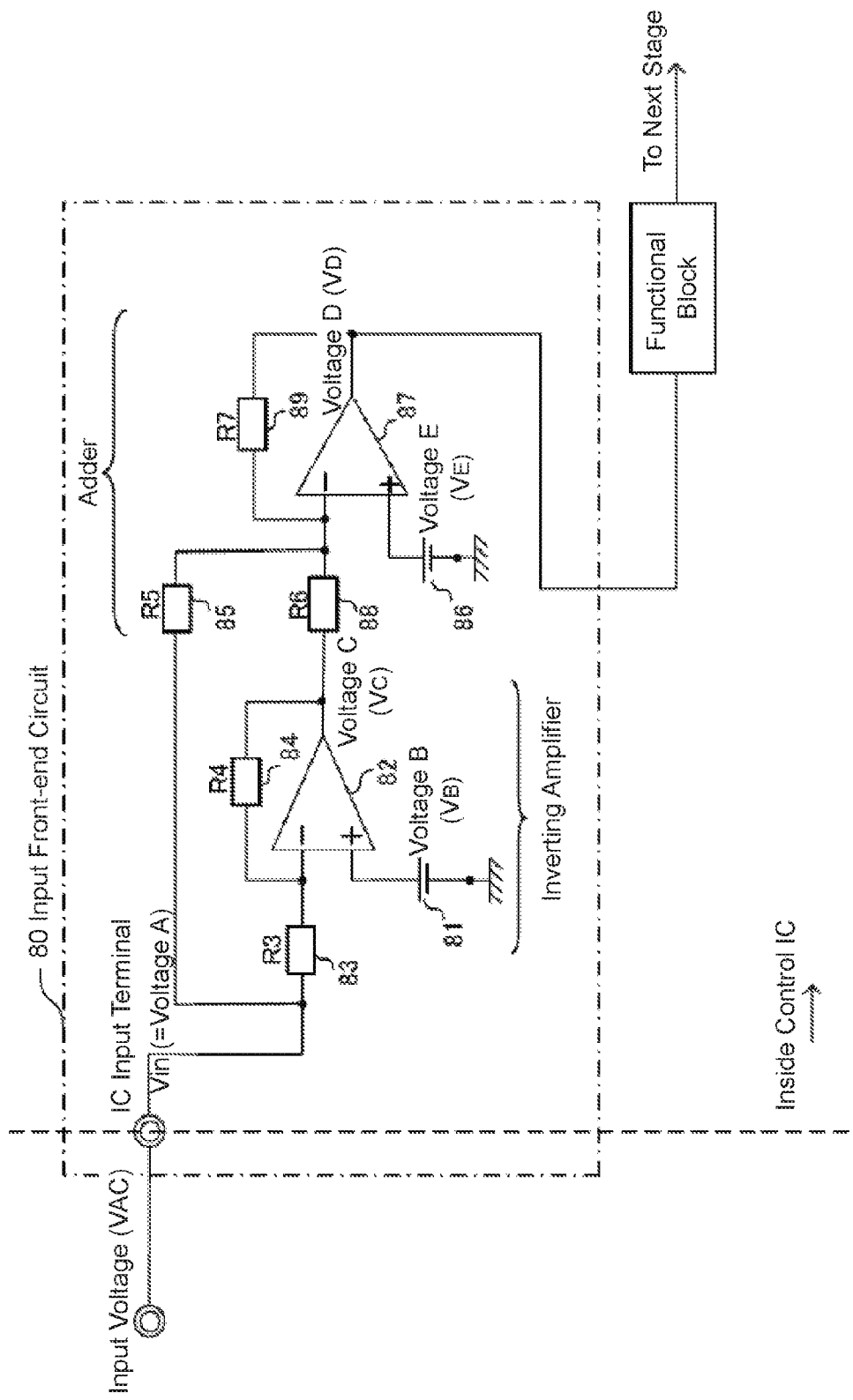
FIG. 4 shows the configuration of an input front-end circuit for a switching power supply control IC according to Embodiment 3 of the present invention.
Figure 5:
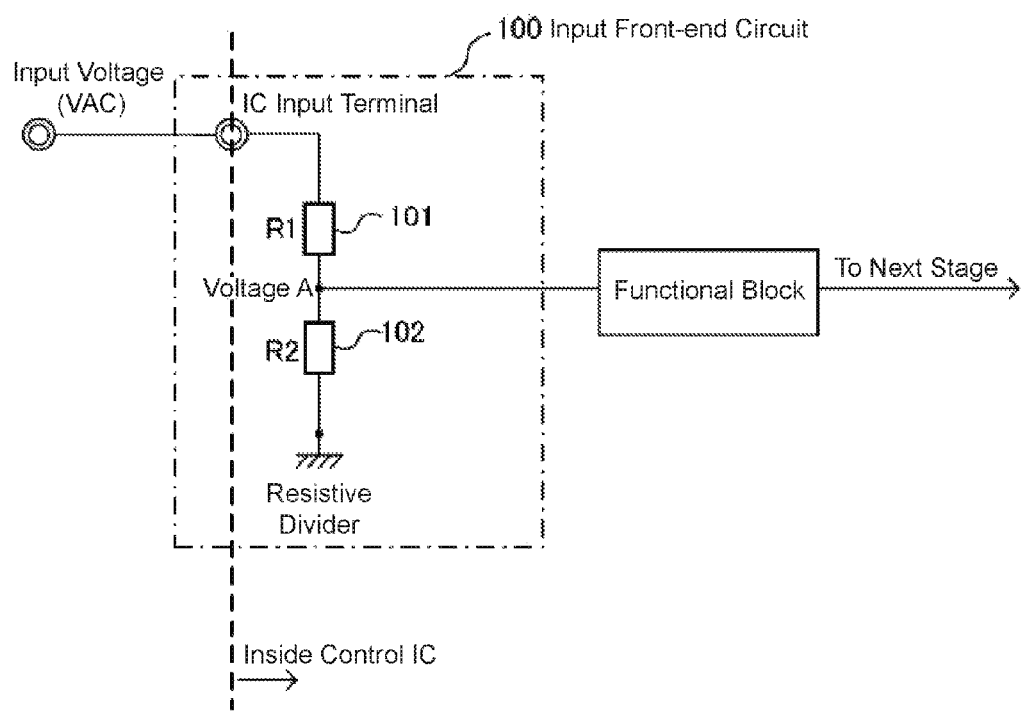
FIG. 5 shows the first out of two example configurations of a conventional input front-end circuit for a switching power supply control IC.
Figure 6:
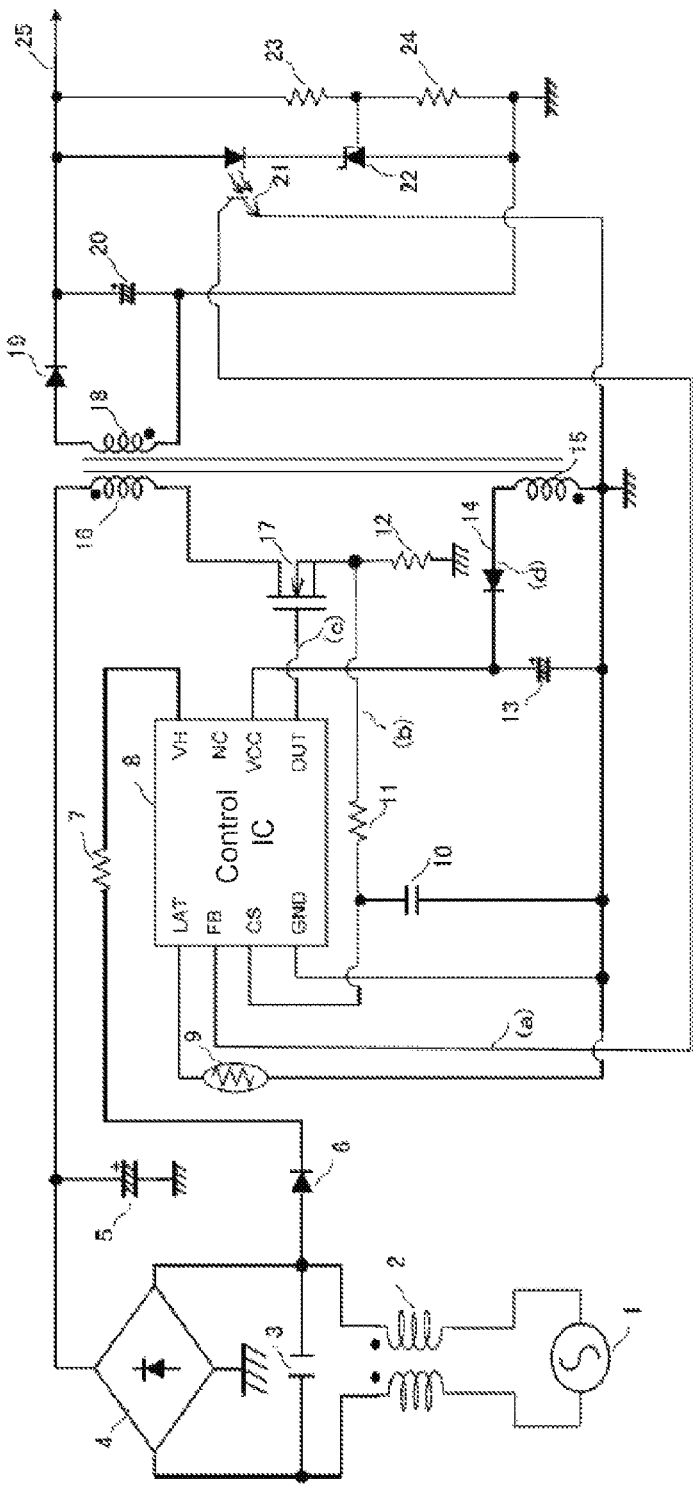
FIG. 6 shows an example configuration of a general switching power supply device configured to include a switching power supply control IC.
Figure 7:
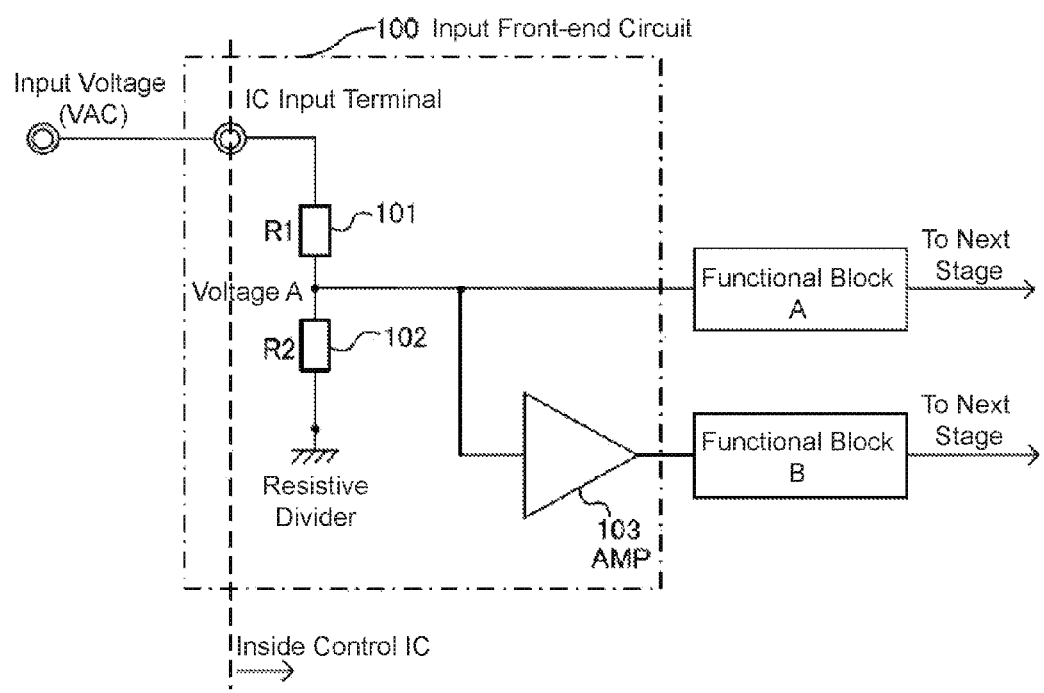
FIG. 7 shows the second out of two example configurations of a conventional input front-end circuit for a switching power supply control IC.

FIG. 4 shows the configuration of an input front-end circuit for a switching power supply control IC according to Embodiment 3 of the present invention. For Embodiment 3, the voltage-dividing resistors R1 (41), R2 (42) from Embodiment 1 shown in FIG. 1 are removed, and the resistor R3 (45) is directly connected to the input voltage going through the input terminal. This configuration corresponds to when the input voltage (VAC, for example) is divided using an external element outside of the control IC, for example. Note that the inverting amplifier is composed of an inverting amplifier circuit. The inverting amplifier circuit is composed of an operational amplifier (82), a reference voltage (81), and resistors R3 (83), R4 (84). The adder is composed of an inverting amplifier circuit. The inverting amplifier circuit is composed of an operational amplifier (87), a reference voltage (86), and resistors R5 (85), R6 (88), R7 (89).

The operations of an input front-end circuit 80 in a switching power supply control IC according to Embodiment 3 of the present invention are described using FIG. 4.

The IC input terminal shown in FIG. 4 receives a voltage $V_{in}$ that corresponds to the voltage A shown in FIG. 1 from the input voltage (VAC, for example) shown.

Similar to the configuration shown in FIG. 1 described above, the input voltage $V_{in}$ enters the inverting amplifier via the resistor R3 (83) to obtain the voltage C ($V_C$).

The resulting voltage C ($V_C$) enters the inverting amplifier circuit that constitutes the adder via the resistor R6 (88) as one of the inputs. In addition, the input voltage $V_{in}$ enters, as another input, the inverting amplifier circuit, which constitutes the adder, via the resistor R5 (85). The adder carries out weighted addition on both of the inputs, or in other words, adds signals together that have been inverted and amplified using different amplification factors, to create an output voltage D ($V_D$).

The resulting voltage D ($V_D$) enters the next stage function block, as a target voltage that can be obtained by equipping the input front-end circuit 80, and is used by the function block for a desired signal processing.

Even in FIG. 4, it is possible to have a configuration in which the resistor R5 (85) has been removed similar to Embodiment 2 shown in FIG. 3, thus there has been an attempt to calculate and determine the voltage D ($V_D$) when the resistor R5 (85) has not been removed in FIG. 4 and the voltage D ($V_D$) when the resistor R5 (85) has been removed as is shown below.

Note that in FIG. 4, the reference voltage B is represented $V_B$. The voltage C is represented by $V_C$. The reference voltage E is represented by $V_E$, and the resistance values for resistors R3, R4, R5, R6, R7 are respectively represented by R3, R4, R5, R6, R7.

(a) In FIG. 4, the formula for calculating the voltage D when the resistor R5 (85) has not been removed is below.

$$V_C = V_B - (V_{in} - V_B) \times R4/R3$$

$$V_D = V_E - ((V_C - V_E)/R6 + (V_{in} - V_E)/R5) \times R7$$

$$V_D = ((R4 \times R7)/(R3 \times R6) - R7/R5) \times V_{in} - ((R4 \times R7)/(R3 \times R6) + R7/R6) \times V_B + (1 + R7/R5 + R7/R6) \times V_E \quad \text{Formula 1:}$$

(b) In FIG. 4, the formula for calculating the voltage D when the resistor R5 (85) has been removed is below.

$$V_D = ((R4 \times R7)/(R3 \times R6)) \times V_{in} - ((R4 \times R7)/(R3 \times R6) + R7/R6) \times V_B + (1 + R7/R6) \times V_E \quad \text{Formula 2:}$$

If $K1=(R4 \times R7)/(R3 \times R6)$, $K2=R7/R5$, and $K3=R7/R6$, then Formula 1 becomes Formula 3, which is $V_D=(K1-K2) \times V_{in}-(K1+K3) \times V_B+(1+K2+K3) \times V_E$, and Formula 2 becomes Formula 4, which is $V_D=K1 \times V_{in}-(K1+K3) \times V_B+(1+K3) \times V_E$. Here, when considering the constant term (voltage $V_D$ when $V_{in}=0V$) in Formula 4, $$\text{Constant term} = -(K1 \times V_B) - K3(V_B - V_E) + V_E$$
$$= -K1(V_B - V_E) - K3(V_B - V_E) + (1 - K1) \times V_E$$
$$= -(K1 + K3)(V_B - V_E) + (1 - K1) \times V_E.$$

Thus, the constant term tends to be negative when $V_B > V_E$.

In other words, the first item in the constant term, $-(K1+K3)(V_B-V_E)$, is negative, and the second item, $(1-K1) \times V_E$, is not a large value, thus the constant term tends not to be a large value, and the constant term tends to be negative.

In comparison, when the resistor R5 is present, as can be understood in Formula 3, $K2 \times V_E$ is added to the second clause of the constant term, thus allowing the second clause of the constant term to increase in value.

In other words, when voltage B>voltage E, it is desirable to add the resistor R5 in order to ensure that the constant term does not become negative.

By doing this, the output signal (voltage D) of the input front-end circuit 80 is higher than zero voltage when a low input voltage is received, thus making it is easy to distinguish between noise and the signals and making it possible to prevent malfunctions during signal processing within the control IC.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An input front-end circuit for a switching power supply control integrated circuit, comprising:
   a first inverting amplifier that receives a first voltage originating from an input voltage at an input and that receives a first reference voltage at a reference input so as to generate an inverted and amplified voltage as a second voltage;
   an adder comprising a second inverting amplifier that receives the first voltage at a first input, the second voltage at a second input, and a second reference voltage at a reference input so as to output a resulting added, inverted, and amplified signal to one or more components within the switching power-supply control integrated circuit.

2. The input front-end circuit for the switching power supply control integrated circuit according to claim 1, further comprising an input terminal that receives the input voltage and forwards the received input voltage to the first inverting amplifier as the first voltage.

3. The input front-end circuit for the switching power supply control integrated circuit according to claim 1, further comprising:
   an input terminal that receives the input voltage; and
   a resistive divider that divides the input voltage received by the input front-end circuit and forwards the divided input voltage to the first inverting amplifier and the second inverting amplifier as the first voltage.

4. The input front-end circuit for the switching power supply control integrated circuit according to claim 1, wherein the first reference voltage is greater than the second reference voltage.

5. A switching power supply controller, comprising:
   the input front-end circuit for the switching power supply control integrated circuit according to claim 1; and
   the switching power supply control integrated circuit.

6. The switching power supply controller according to claim 5, wherein said input front-end circuit is integrally formed within the switching power supply control integrated circuit.

7. An input front-end circuit for a switching power supply control integrated circuit, comprising:
   a first inverting amplifier that receives a first voltage originating from an input voltage at an input and that receives a first fixed reference voltage at a reference input so as to output an inverted and amplified voltage as a second voltage, the input voltage being a rectified alternating-current commercial power supply;
   a second inverting amplifier that receives the second voltage at an input and that receives a second fixed reference voltage at a reference input so as to output a resulting inverted and amplified voltage to one or more components within the switching power-supply control integrated circuit.

8. The input front-end circuit for the switching power supply control integrated circuit according to claim 7, further comprising an input power supply terminal that receives the input voltage and forwards the received input voltage to the first inverting amplifier as the first voltage.

9. The input front-end circuit for the switching power supply control integrated circuit according to claim 7, further comprising:
   an input power supply terminal that receives the input voltage; and
   a resistive divider that divides the input voltage received by the input front-end circuit and forwards the divided input voltage to the first inverting amplifier unit as the first voltage.

10. The input front-end circuit for the switching power supply control integrated circuit according to claim 7, wherein the first fixed reference voltage is greater than the second fixed reference voltage.

11. A switching power supply controller, comprising:
    the input front-end circuit for the switching power supply control integrated circuit according to claim 7; and
    the switching power supply control integrated circuit.

12. The switching power supply controller according to claim 11, wherein said input front-end circuit is integrally formed within the switching power supply control integrated circuit.

* * * * *